United States Patent [19]
Kerwin et al.

[11] Patent Number: 5,121,263
[45] Date of Patent: Jun. 9, 1992

[54] METHOD AND APPARATUS FOR DETERMINING THE ERROR RATE OF MAGNETIC RECORDING DISK DRIVES HAVING A AMPLITUDE SAMPLING DATA DETECTION

[75] Inventors: Gregory J. Kerwin; James W. Rae, both of Rochester, Minn.

[73] Assignee: International Business Machines Corporation, Armonk, N.Y.

[21] Appl. No.: 429,750

[22] Filed: Oct. 31, 1989

[51] Int. Cl.⁵ .............................................. G11B 5/09
[52] U.S. Cl. ........................................ 360/53; 360/31
[58] Field of Search .......................... 360/54, 53, 31; 324/212; 371/6, 48, 24, 25.1, 29.1, 28, 71, 70, 5.1, 5.2, 21.8; 369/53

[56] References Cited
U.S. PATENT DOCUMENTS

4,394,695  7/1988  Mahon ............................... 360/53
4,504,872  3/1985  Peterson ............................. 360/40
4,578,721  3/1986  Brannan, Jr. ....................... 360/51
4,970,609  11/1990  Cunningham et al. .............. 360/51

*Primary Examiner*—Aristotelis Psitos
*Assistant Examiner*—Joseph P. Kraynak, Jr.
*Attorney, Agent, or Firm*—Robert W. Lahtinen

[57] ABSTRACT

In a disk drive providing amplitude sampling data detection, the amplitude of an analog read back signal is sampled at data clock intervals. The resulting analog values are converted to digital equivalent values. The digital equivalent values are each compared to an expected digital values that is representative of the data that was originally recorded on the disk, to thereby generate a different value. The resulting collection of difference values are magnitude segregated, and then stored in a plurality of registers, for later use in providing a histogram that is a measure of the disk drive's read error rate.

20 Claims, 4 Drawing Sheets

METHOD AND APPARATUS FOR DETERMINING THE ERROR RATE OF MAGNETIC RECORDING DISK DRIVES HAVING A AMPLITUDE SAMPLING DATA DETECTION

DESCRIPTION

1. Field of the Invention

The invention relates to the field of magnetic recording devices having rotating magnetic memory in the form of magnetic recording disks, and more particularly to a method and an apparatus that enables the error rate of such a disk drive to be determined.

2. Background of the Invention

Practitioners in the art of rotating magnetic memory devices, also known as disk drives, direct access storage devices, and DASD devices, have recognized for some time that one measure of the accuracy with which such a device has been manufactured is the bit error rate of the device.

One means of testing such a device is to record a known data pattern on the disks, and then read back the data pattern, in order to detect read errors. This procedure usually is very time consuming in that a read error usually does not occur until after a very large number of data patterns have been written to the disk(s) and then read back. For example, this classical testing technique requires that the quantity of data read back from the disk(s) be greater than the reciprocal of the error rate of the disk drive being tested.

As a result, others have attempted to shorten the time that is required to obtain a measure of a disk drive's error rate.

U.S. Pat. No. 4,394,695 is an example. This patent relates to the evaluation of the bit error rate of magnetic recording systems by providing a window generating means that is responsive to the raw data that is read back from the magnetic recording media. This window generating means operates to provide a plurality of data windows, each of a different width (the different data windows in the patent being simulated by providing a plurality of raw data delays). The position of the data is compared to the edges of this plurality of windows. Data that falls outside of a window is counted as an error, and is accumulated in a counter for that particular window.

A well known technique for evaluating a magnetic recording system is the window margin test. In this test, data is read, and the overall bit distribution within a clock defined data window is measured. U.S. Pat. No. 4,578,721 describes this type of a test, and also describes the injection of noise into the drive, for the purpose of monitoring the bits that then fall outside the window, or in the alternative, the narrowing of the window size to insure that errors are not later encountered in the drive's operating environment, when a full length window is used. The patent offers an improvement for noise and media defect detection, wherein data is first delayed toward one edge of the window until errors are detected. The data is then advanced 5% toward the center of the window from its failure point. Noise or media defects will thereafter cause an error.

The above mentioned prior means of determining signal detection parameter margins in storage devices all deal with signal channels employing peak detection. In peak detection signal channels, a read signal pulse is compared to a pair of adjacent read clock pulses, also referred to as a data detection window. Generally in all of these techniques, a measured distance between the data pulses and an edge of the data window is noted, and, based upon this measured distance, some form of an algorithmic means is used to predict at what data rate read data errors will occur. These prior techniques have been used as manufacturing qualifying tools, for example.

While the above mentioned prior techniques have tended to shorten the time that is needed to test rotating memory devices, no such technique is known for use with rotating memory devices having amplitude sampling detection signal channels, i.e. channels wherein the amplitude of an analog read signal is sampled at reoccurring clock intervals, in order to detect the binary data that was read back from a disk for each clock interval.

The present invention provides a means whereby the data error rate of rotating memory devices, employing amplitude detection, may be predicted.

SUMMARY OF THE INVENTION

The present invention provides a method and an apparatus for rapidly determining the error rate performance of rotating memory magnetic disk storage devices that utilize amplitude sampling detection channels. A means of determining the margin distributions of a detection parameter for this type of disk drive is provided.

Without limitation thereto, embodiments of the invention will be described with reference to partial response (PR) signalling techniques that utilizes amplitude detection of the analog read back data signal. More specifically, a read signal channel operating in the mode class IV partial response (PRIV) coding technique will be described. The specific form of PRIV to be described is of the partial response maximum likelihood (PRML) type.

Amplitude detection techniques, of which PR is an example, do not allow the use of the above described prior testing techniques, for example window margin testing, because the position of an analog read signal peak, in relation to the edges of a data window, is of no significance in amplitude detection devices, which devices depend upon the amplitude of the analog signal at a clock interval as a means of detecting the binary data that was previously written at the clock interval.

While the above forms of partial response data encoding/decoding are well known in the art, U.S. Pat. No. 4,970,609 is incorporated herein by reference, both for its background teaching and for its teaching of one way in which a data clock may be generated from the analog read signal that is provided by reading PRIV encoded data back from a disk.

In accordance with an object of the invention, a pattern of data, i.e. a plurality of binary bits, is first written on the disk of the drive being tested. This data is then read back from the disk. The amplitude of the incoming analog read signal is then sampled at reoccurring clock intervals. In a preferred embodiment, the analog amplitude of each sample is digitized. This sample amplitude is then compared to reference amplitude values that are expected to be received for each binary bit that was recorded on the disk. For example, the digitized read signal is then compared to digital values that are expected to be received for each binary bit that was recorded on the disk.

This comparison provides a difference value for each binary bit that was stored on the disk. Like magnitude difference values are stored in one of a plurality of buffers or registers. The count content of this plurality of buffers provides a histogram depicting the distribution of the like magnitude difference values. This relative amplitude histogram provides a output means for determining the bit error rate of the disk drive being tested, i.e. the shape of the histogram provides a measure of the error rate pass/fail status of the disk drive being tested.

As a feature of the invention, the circuit means for accomplishing the above defined testing of a disk drive may be placed within each disk drive, to form an integral part thereof. In this way, the circuit means may be periodically enabled to self test the error rate of the disk drive. These periodic self test results can then be logged in a memory means, thus enabling the user to monitor disk drive performance with use, aging, and the like.

As a further feature, the construction and arrangement of the invention can be used to evaluate anticipated circuit changes and the like to a disk drive. By comparing the measured data error rate both before and after incorporation of the circuit changes into the disk drive, it can be quickly determined if an anticipated change will improve or degrade the performance of the disk drive's data channel.

An object of the invention is to provide a method and an apparatus for determining the data error rate of a rotating magnetic memory device having a magnetic recording disk on which a pattern of binary data bits has been written, and having amplitude detection circuit means for detecting the binary data bits upon reading the same back from the disk, the detection circuit means including data clock means.

This is accomplished in accordance with the invention by reading the binary data pattern back from the disk, to thereby generate a continuous analog signal that is representative of the recorded binary data pattern. This analog signal is now amplitude sampled at a plurality of intervals of the data clock, to thereby produce a plurality of analog amplitudes, each individual analog amplitude being representative of the individual binary bit that was read back from the disk at each of the plurality of clock intervals.

This plurality of analog amplitudes is then converted to a plurality of digital amplitudes.

Each digital amplitude is now compared to a reference digital amplitude that is representative of the individual binary bit that was read back from the disk at each of the plurality of intervals, and a plurality of difference amplitudes are generated as a result of this comparison.

These difference amplitudes are stored, and then translated into a measure of the data error rate of the rotating magnetic memory device.

These and other objects and advantages of the invention will be apparent to those of skill in the art upon reference to the following detailed description of the invention, which description makes reference to the drawing.

DETAILED DESCRIPTION OF THE INVENTION

The present invention finds utility when used with any type of a disk drive that provides amplitude sampling data detection. In accordance with the invention, the amplitude of a read back signal is sampled at data clock intervals. These sample signals are then compared to expected signals that are representative of the data that was originally recorded on the disk, to thereby provide difference signals. The resulting difference signals are then magnitude segregated and stored for use in providing a histogram that is a measure of the disk drive's read error rate.

The invention will be described with reference to a disk drive that contains a write/read channel means having partial response maximum likelihood (PRML) detection. However, the spirit and scope of the invention is not to be limited thereto.

Reference may be made to U.S. Pat. No. 4,970,609, above mentioned, for a general description of partial response coding techniques. In summary, this coding technique is a form of pulse amplitude modulation that is used to convey digital information, wherein the effect of a known amount of intersymbol magnetic recording interference can be eliminated, because the interference is of a known quantity.

Figure 1:
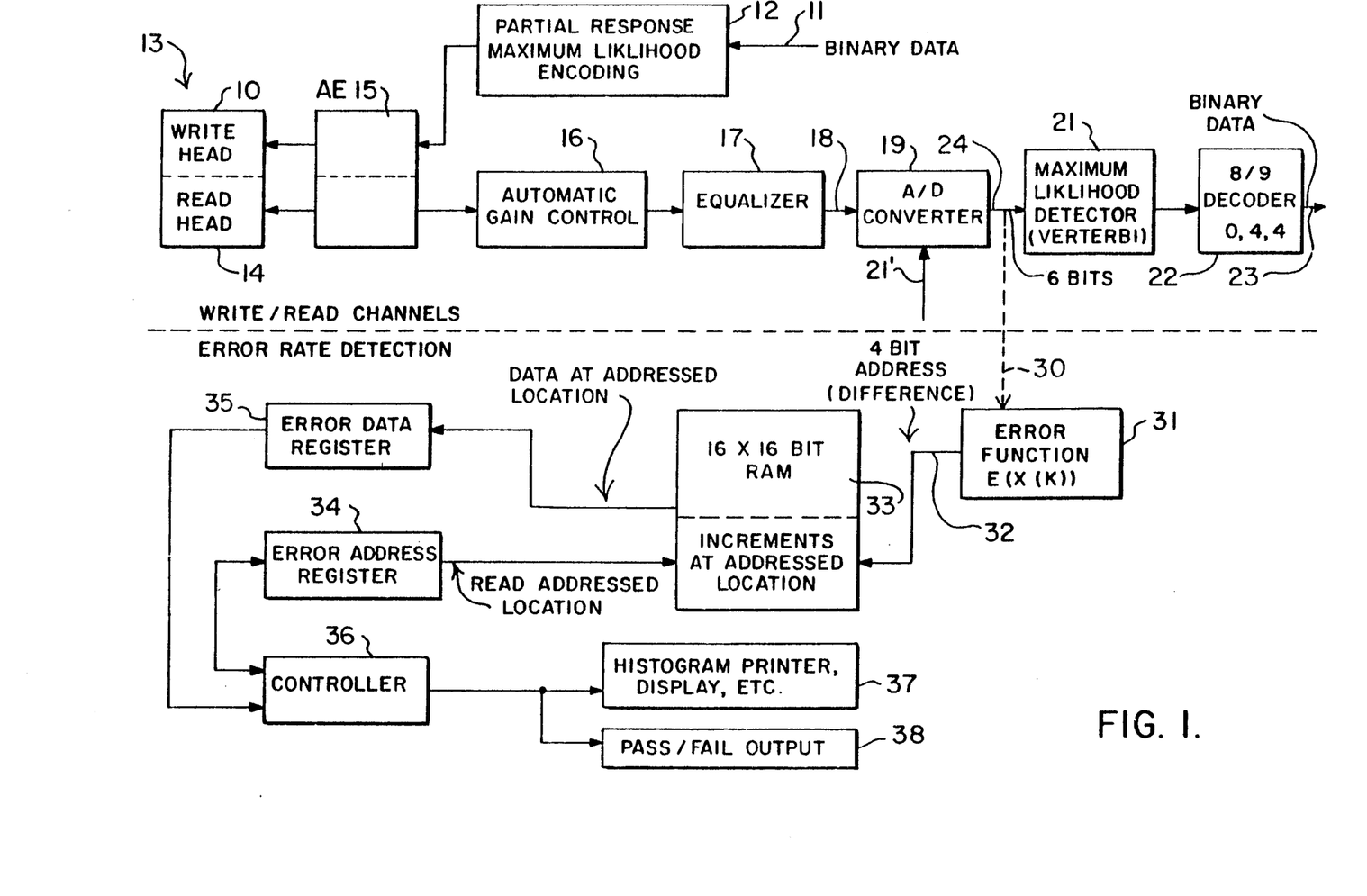
FIG. 1 is a schematic showing of the write/read channel circuit means of an exemplary disk drive having an amplitude signal detection means in the read channel, wherein the read channel's analog read signal is digitized, and then connected to an error rate detection circuit means in accordance with the invention.

FIG. 1 is a schematic showing of the write/read channel means of an exemplary disk drive having an partial response IV (PRIV) maximum likelihood coding. This figure also shows an error rate measuring/detection circuit means in accordance with the invention.

Class IV partial response coding (PRIV) is a three signal level form of partial response coding. Advanced amplitude sampling coding and detection techniques, of which PRIV is an example, intentionally provide intersymbol interference. As a result, peak amplitude signal detection cannot be used to detect the binary content of the analog read back signal that is generated when such coded data is read back from the disk.

Figure 2:
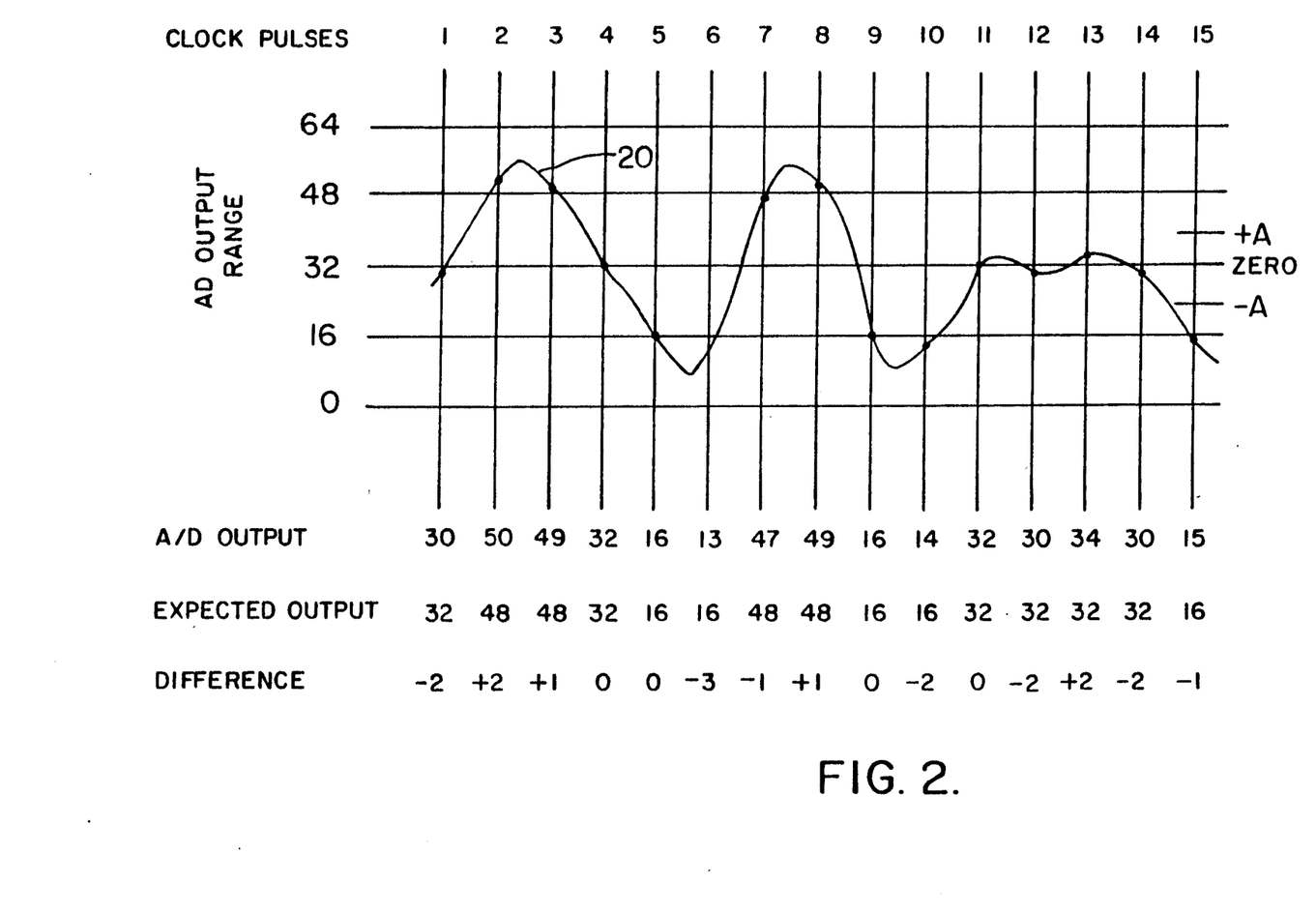
FIG. 2 shows an exemplary analog read signal that is generated by the read channel circuit means of FIG. 1, showing the digitized samples that are generated therefrom by the analog to digital convertor of FIG. 1 at a number of clock pulse intervals or times, and showing a comparison of the digitized samples to expected digital values of the same, to thereby generate difference values corresponding to each clock pulse.

FIG. 2 shows an exemplary analog read back signal 20, as it is generated by the disk drive read channel means of FIG. 1.

The analog read signal that is derived from reading a magnetic track that has been recorded (i.e. written) by the use of the PRIV technique provides three critical signal amplitudes, labeled "Zero", "+A" and "−A" in FIG. 2. As is well known to those skilled in the art, the values "+A" and "−A" comprises detection thresholds that enable the PRIV circuit means to detect the reading of binary 1's.

Note that FIG. 2 also contains the offset decimal values "32", "48" and "16", wherein the value "32" is associated with the above mentioned value "Zero". The decimal values "32", "48" and "16" represent the values of an offset binary numbering system whose values are provided by the output of analog to digital convertor (A/D) 19 shown in FIG. 1, as will be explained.

Note also that PRIV analog read signal 20 of FIG. 2 contains positive and negative peak signal amplitudes that are caused by reading recorded magnetic transitions from the disk. However, in partial response coding, the binary content of the recorded data is not contained in the time position of these peaks, as it is in the peak detection recording technology discussed above. For example, in PRIV coding, the presence of a signal amplitude between −A and +A at a clock interval represents (i.e. is decoded as) a binary "0", and the presence of an amplitude greater than +A or less than −A at a clock interval represents a binary "1".

By way of a summary description of the invention, the top row of FIG. 2 contains a sequence of clock pulse times, labeled clock pulses 1 through 15. At clock pulse 2, the amplitude of analog read signal 20 is decimal 50, see the row labeled "A/D output". Since the amplitude of signal 20 is above "+A" at clock time 2, the read signal sample amplitude of 50 is decoded as a binary "1" data bit by the disk drive's read channel. In accordance with operation of the invention, the expected value of decimal 48, see the row labeled "Expected Output", is compared to the actual value of signal 20, i.e. to the value 50, to thereby derive a difference value of +2 (i.e. the signal value was two units higher than was expected at clock pulse 2 for the reading of a binary "1").

In like manner, a difference value is provided for each clock pulse during the reading of the recorded data from the disk(s) of the disk drive being tested, see the row labeled "Difference". The magnitude segregated collection of these difference values then form a testing means, such as the histogram of FIG. 4, enabling the failure rate of the disk drive to be determined. Note that this test can be performed without a failure to properly read binary recorded data actually occurring. That is, the expected A/D output values may all fall within values allowing proper decoding of binary "1" and "0", and yet in accordance with the invention, the history represented by the difference row of FIG. 2, and the histogram of FIG. 4, enables a failure rate of the disk drive to be determined with great accuracy.

The output data of the present invention may, for example, comprise a go/no-go test wherein rejected disk drives from a manufacturing process may be quickly determined.

FIG. 1 is a schematic showing of the write channel and the read channel of an exemplary disk drive having a signal amplitude coding means in the write channel, and having a signal amplitude decoding means in the read channel, wherein the read channel's analog read signal is digitized, and the digitized values are connected to an error rate detection circuit means in accordance with the invention.

With reference to FIG. 1, the write portion 10 of a magnetic transducer 13 is first used to write a number of disk tracks with random input binary data, as is provided to the write channel by way of input conductor 11. The form that data 11 takes is not critical to the invention. However, in an embodiment of the invention it has been found advantageous to write random binary data. Data 11 is encoded to provided for amplitude sampling data detection during the subsequent reading back of the disk tracks. For example, partial response maximum likelihood encoding network 12 is used to encode binary data 11 before the data is written to the disk tracks.

While the construction and arrangement of the write and read channels of FIG. 1 are not to be taken as a limitation on the invention, these two channels both include an arm electronics network (AE) network 15. As is well known by those skilled in the art, network 15 provides a variety of electronic functions, including for example amplification of the write/read signal.

Once the disk is written, the read channel, and read portion 14 of head 13, is used to read back the written encoded data. The read channel of FIG. 1 includes AE network 15, an automatic gain control network 16 and an equalization network 17. As a result of the operation of network means 15-17, an analog read signal is present on conductor 18. This analog signal is connected to the input of A/D convertor 19. By way of example, analog signal 20 of FIG. 2 is present on conductor 18.

In the decoding of analog read signal 20, the analog values or amplitudes of signal 20 are sampled at clock times or intervals of a clock that is provided to A/D convertor 19 by way of conductor 21', shown in FIG. 1. The frequency of this clock may be synchronized to read back signal 20 as is described in above mentioned U.S. Pat. 4,970,609, if desired.

Again without limitation thereto, the disk drive read channel shown in FIG. 1 includes a maximum likelihood detector network 21 (also known in the art as an ML detector or a Verterbi detector). The basic function of detector 21 is to decode the A/D output values of FIG. 2 into binary "1" and "0" at each pulse of clock 21.

In the exemplary disk drive of FIG. 1, a decode network 22 is also provided. The binary output 23 of network 22 comprises the original binary input 11 that was presented to the write channel during the writing of data to the disk drive.

Dotted line conductor 30 connects the digitized sample signal output 24 of A/D convertor 19 (i.e. the row labeled "A/D output" in FIG. 2) to an error rate detection circuit means in accordance with the invention. Conductor 30 is dotted to indicate that the circuit means of the invention may be connected to conductor 24 only during the testing of the disk drive, or, alternatively, the circuit means of the invention may be formed as an integral portion of each disk drive, as the disk drive is manufactured.

In this explanation, but without limitation thereto, the output of A/D convertor 19 comprises a 6-bit binary word whose minimum value is "000000" (i.e. decimal 0) and whose maximum value is "111111" (i.e. decimal 63), as is shown in the following TABLES A-D. These decimal values, and more specifically the decimal values of 0, 16, 32, 48 and 64, comprise the vertical axis of FIG. 2. The pulses of clock 21' comprises the horizontal axis of FIG. 2.

Note that the decimal values 16, 32 and 48 are significant values in that these values are the three expected values against which the digitized sample magnitudes of signal 20 are compared at the time of each clock pulse.

In FIG. 2, analog read signal 20 is shown with the mid range A/D convertor output value of 32 as a base line for signal 20, i.e. the zero value of signal 20 is located on the horizontal value line 32 of FIG. 2. As a result, the various digitized signal values that comprise the output of A/D convertor 19 provide an offset binary numbering system by which the amplitude of analog read back signal 20 is determined.

As will be appreciated by those skilled in the art, many different means may be provided for determining a difference value for each sample of analog read back signal 20 within the spirit and scope of the invention.

In a preferred embodiment of the invention, the 6-bit output of A/D convertor 19 is applied to the input of error function network 31. Network 31 operates to determine the difference between (1) the expected baseline value of 32 for analog signal 20, (2) the expected negative value of 16 for signal 20, or (3) the expected positive value of 48 for signal 20, at each of the respective pulses of clock 21.

An example of the first above mentioned difference occurs at clock pulse 1. At this clock pulse, the 6-bit A/D output value of 011110 (decimal 30) is correctly decoded as a binary "0". The expected value is, however, 100000 (decimal 32). As a result, error function network 31 generates a difference value of 0110 (decimal $-2$) on its output conductor 32.

An example of the second above mentioned difference occurs at clock pulse 6. At this clock pulse, the 6-bit A/D output value of 001101 (decimal 13) is correctly decoded as a binary "1". The expected value is, however, 010000 (decimal 16). As a result, error function network 31 generates a difference value of 0101 (decimal $-3$) on its output conductor 32.

The function of error function network 31 is shown in the following TABLES A-D, as will be explained in detail. In summary, error function network 31 operates to map from the 64 different 6-bit input values that can be provided by output 24 of A/D convertor 19, to 16 different addressable storage locations within the 16×16 bit RAM shown in FIG. 1. Stated differently, error function network 31 operates to convert a 6-bit input on conductor 30 to a 4-bit output on conductor 32.

Figure 3:
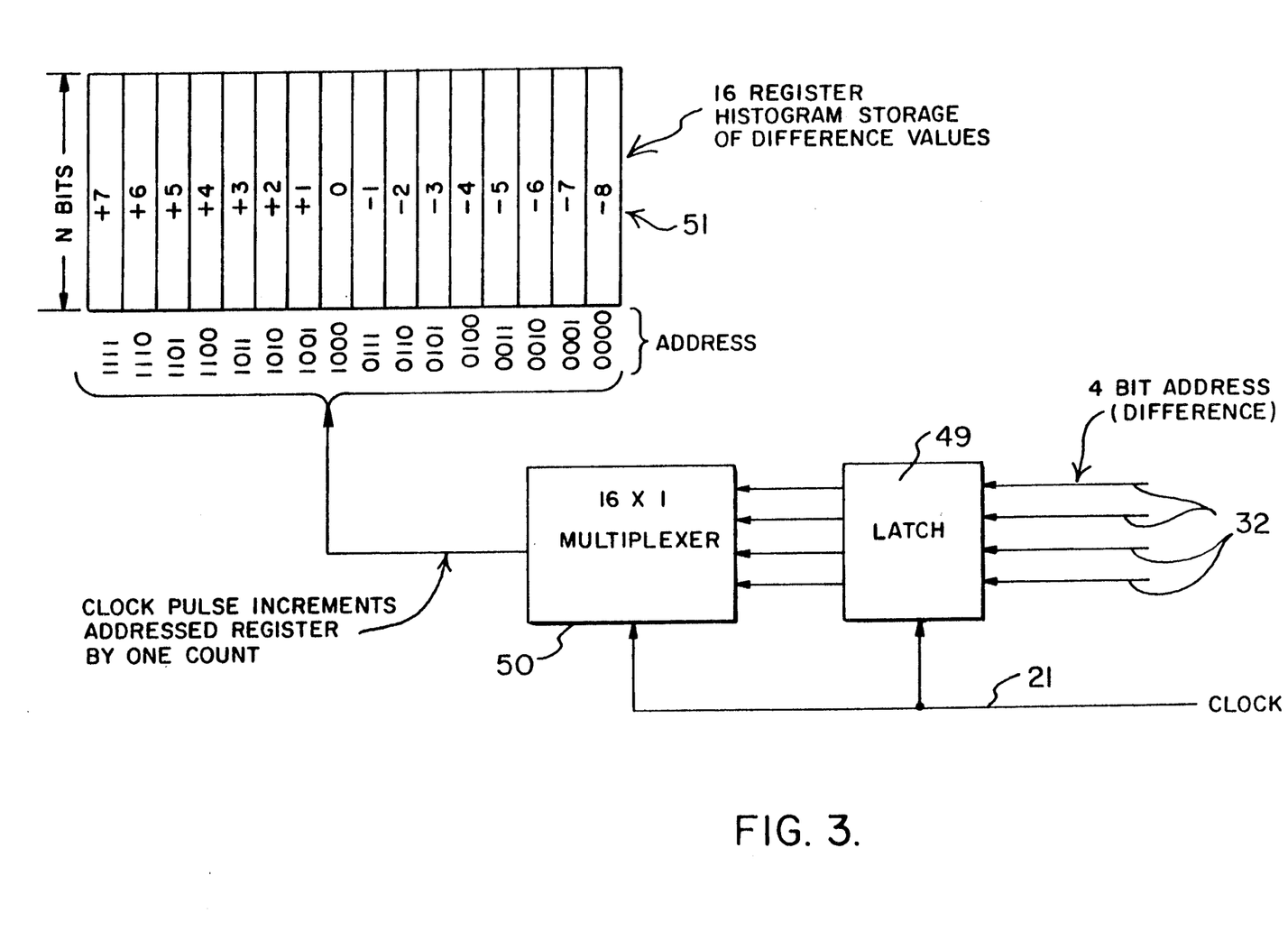
FIG. 3 shows an embodiment of the 16 × 16 bit RAM shown in FIG. 1, and shows how the difference values of FIG. 2 operate to address storage locations of the RAM, thereby causing a RAM storage location (i.e. a register of FIG. 3) to increment by one count upon the occasion of each individual addressing event.

In this manner, error magnitudes are segregated, and counts of each individual error magnitude are accumulated in individual storage locations of RAM 33, in accordance with the frequency with which each addressable location has been addressed during the testing of a disk drive. RAM 33 is constructed and arranged so that the count stored in an addressable location of the RAM is incremented by one count for each addressing event of that storage location. FIG. 3 shows an embodiment of RAM 33 which includes 16 registers or counters, as will be described.

In the FIG. 1 embodiment of the invention, but without limitation thereto, error function network 31 has the effect of bracketing 16 sample error slots about each of the expected sample values of decimal 48, 32 and 16, which values are shown on the vertical axis of FIG. 2. Each of these slots corresponding to one of the sixteen different storage locations of RAM 33. This effectively puts error zones, represented by the storage locations, on each side of these expected values, with the addressing of storage location "0" representing a no error condition in a sample's magnitude. Thus the above mentioned mapping function measures the difference between magnitude of a received sample value and the expected magnitude value for the sample, and causes the measured difference magnitude to be logged as one event into the corresponding storage location, i.e. a measured difference value of +3 is logged into the +3 storage location, as will be described.

Figure 4:
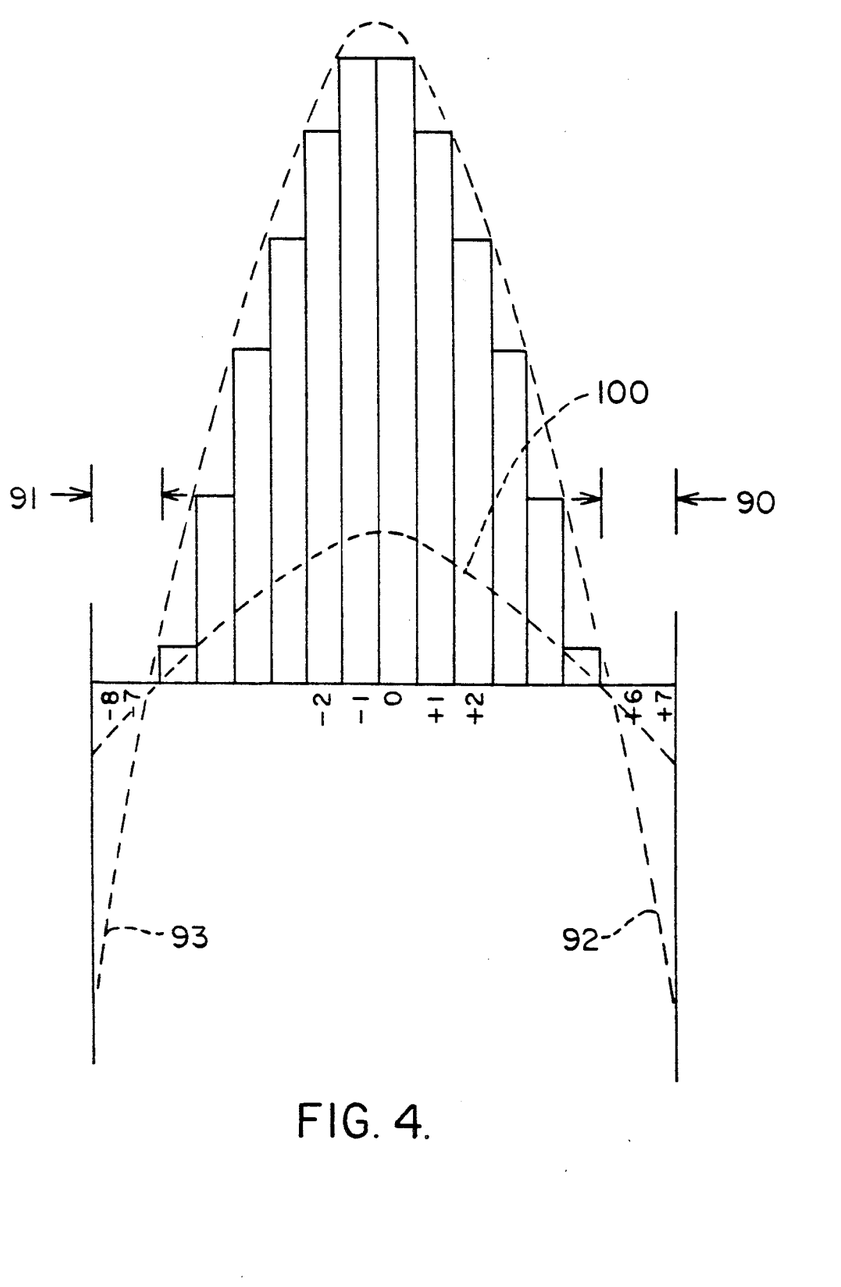
FIG. 4 shows a representative histogram of the type that is provided by the counts that are stored in the registers of FIG. 3 as a result of the testing of a disk drive having amplitude signal detection means in the read channel thereof.

FIG. 4 is a representative histogram of the type that is provided by the various count magnitudes that are stored in the 16 addressable locations of RAM 33 after a disk drive has been tested in accordance with the invention. The horizontal axis of this figure presents the sixteen storage locations, starting with a storage location "$-8$" on at the left end of the horizontal axis, and progressing through storage location "0", to storage location "+7" at the right end of the horizontal axis. The vertical axis presents the relative count magnitudes that are stored in each storage location at the end of a test.

As will be apparent from a later consideration of TABLES A-D, storage location "$-8$" is addressed whenever the 4-bit output of error function network 31 comprises "0000", storage location "0" is addressed whenever the 4-bit output of error function network 31 comprises "1000", and storage location "+7" is addressed whenever the 4-bit output of error function network 31 comprises "1111".

By way of example, the histogram of FIG. 4 may be generated by reading out the contents of the sixteen storage locations of RAM 33 after the testing of the disk drive. Controller 36, error address register 34 and error data register 35 are provided for this purpose. Controller 36 can then be used to drive display such as a cathode ray tube or a printer 37. In addition, controller 36 may provide a go/no-go output by way of pass/fail indicator or output means 38.

FIG. 3 shows an embodiment of the 16×16 bit RAM 33 of FIG. 1 wherein the sixteen addressable storage locations of RAM 33 are formed by an address latch 49, a 16×1 multiplexer 50, and a bank 51 of sixteen individual registers, each register being N bit positions in length (in FIG. 1, N=16).

The input to latch 49 comprises the 4-bit binary output word 32 from error function network 31, shown in FIG. 1. This input 32 includes the "difference" value row shown in FIG. 2. The 4-bit word values that are possible at input 32 cover the range of the sixteen binary values from "1111" to "0000", and also covers a correspondingly defined 16-slot decimal range that extends from a decimal value of "+7" to a decimal value of "$-8$", as is defined by, and as will be described relative to, TABLES A-D.

The defined relationship between this binary word range and this decimal slot range is shown in FIG. 3 by way of a 4-bit address that is associated with each of the sixteen registers 51, wherein the sixteen individual registers are identified as "+7", "+6"—"$-7$" and "$-8$". This convention is also used in the following TABLES A-D.

As testing of the disk drive progresses, a 4-bit binary number within the above range of numbers is presented as an input TO latch 49 at the time of the occurrence of each pulse of clock 21. This number is retained in latch 49 until the time of occurrence of the next clock pulse.

Latch 49 presents this 4-bit number to multiplexer 50. Multiplexer 50 then operates to address one of the sixteen registers 51, and clock pulse 21 increments the content of that register by one count.

By way of further explanation, assume that register "+1" contains a count of "M", and that the next 4-bit difference word that is applied to the input of latch 49 is "1001" (for example, the difference row value of +1 that is measured at clock pulse 3 in FIG. 2). This event will cause the content of register "+1" to increment to the value "M+1". In this way, the measured difference values are magnitude segregated, and like magnitude difference values are counted.

After the disk drive has been tested, a microprocessor, such as controller 36 of FIG. 1, can be used to address the individual registers 51 in order to generate an output such as at 37 and/or 38 of FIG. 1.

The functioning of error function network 31 is shown in the following tables. In summary, error function network 31 maps from 64 different 6-bit input values, as is provided by the output of A/D convertor 19, to 16 different addressable locations within RAM 33 of FIG. 1, or to sixteen different addressable registers of FIG. 3. In this manner, counts are accumulated in each storage location or register, in accordance with the frequency with which each addressable location or register has been addressed during the testing of a disk drive.

Error function network 31 has the effect of bracketing a 16 sample count or slot region about each of the expected sample values of decimal 48, 32 and 16 shown on the vertical axis of FIG. 2, each of these slots corresponding to one of the sixteen different storage locations or registers. This effectively puts error bars or zones, represented by the storage locations or registers, on each side of these expected values, with the addressing of storage location or register "0" representing a no error condition in a sample's magnitude. Thus the above mentioned mapping function measures the difference between magnitude of a received sample value and the expected magnitude value for the sample, and causes the measured difference magnitude to be logged as one event into the corresponding storage location or register, i.e. a measured difference value of +3 is logged into the +3 register of FIG. 3.

With reference to the following tables, (1) TABLE A shows the operation of error function network 31 for the 6-bit outputs of A/D convertor 19 in the range of binary values from 111111 to 110000, i.e. in the range of values of the FIG. 2 analog read signal that fall within the decimal values from 63 to 48, as shown on the vertical axis of FIG. 2, (2) TABLE B shows the operation of error function network 31 for the 6-bit outputs of A/D convertor 19 in the range of binary values from 101111 to 100000, i.e. the range of values of the FIG. 2 analog read signal that fall within the decimal values from 47 to 32, as shown on the vertical axis of FIG. 2, (3) TABLE C shows the operation of error network 31 for the 6-bit outputs of A/D convertor 19 in the range of binary values from 011111 to 010000, i.e. the range of values of the FIG. 2 analog read signal that fall within the decimal values from 31 to 16, as shown on the vertical axis of FIG. 2, and (4) TABLE D shows the operation of error network 31 for the 6-bit outputs of A/D convertor 19 in the range of binary values from 001111 to 000000, i.e. the range of values of the FIG. 2 analog read signal that fall within the decimal values from 15 to 0, as shown on the vertical axis of FIG. 2.

In these four tables, the values that are within parentheses are the decimal equivalents of the binary numbers immediately adjacent thereto.

The column of the tables labeled "Increment Register" refers to the register of FIG. 3 (sixteen registers, labeled "−8" through "+7" are provided in FIG. 3), whose number content is incremented by one count each time that error function network 31 generates the 4-bit address of the particular register. For example, each time the output of A/D convertor 19 provides one of the three expected outputs upon the occurrence of a pulse of clock 21 (i.e. one of the decimal values 48, 32 or 16 of FIG. 2), error function network 31 generates the 4-bit address "1000", and register "0" is addressed and incremented by one count. After the disk drive has been tested, it is usual that the count contained in registers "0" and "−1" are the highest of all registers, and are approximately equal in value, as is shown in the example histogram of FIG. 4.

The column of the tables labeled "Increment Register" also refers to the storage location of RAM 33 of FIG. 1 (sixteen storage locations are provided), whose number content is incremented by one count each time that error function network 31 generates the 4-bit address of the particular RAM storage location.

In these tables the exemplary A/D output values that are shown in FIG. 2 for clock pulses 1-15 are also shown in parentheses. This is done as an aid to understanding how these exemplary A/D output values cause specific storage locations or registers to increment by one count. For example, in TABLE C and A/D output of decimal 30 is shown, and as a result, the register "−2" of FIG. 3 is incremented by one count.

TABLE A

| A/D Output | Error Function Output Address | Increment Register |
|---|---|---|
| 111111 (63) | 1111 (15) | +7 |
| 111110 | . | . |
| 111101 | . | . |
| 111100 | . | . |
| 111011 | . | . |
| 111010 | . | . |
| 111001 | . | . |
| 111000 (56) | 1111 (15) | +7 |
| 110111 (55) | 1111 (15) | +7 |
| 110110 | 1110 | +6 |
| 110101 | 1101 | +5 |
| 110100 | 1100 | +4 |
| 110011 | 1011 | +3 |
| 110010 (50) | 1010 | +2 |
| 110000 (49) | 1010 | +1 |
| 110000 (48) | 1000 | 0 |

TABLE B

| A/D Output | Error Function Output Address | Increment Register |
|---|---|---|
| 101111 (47) | 0111 (7) | −1 |
| 101110 | 0110 | −2 |
| 101101 | 0101 | −3 |
| 101100 | 0100 | −4 |
| 101011 | 0011 | −5 |
| 101010 | 0010 | −6 |
| 101001 | 0001 | −7 |
| 101000 (40) | 0000 (0) | −8 |
| 100111 (39) | 1111 (15) | +7 |
| 100110 | 1110 | +6 |
| 100101 | 1101 | +5 |
| 100100 | 1100 | +4 |
| 100011 | 1011 | +3 |
| 100010 (34) | 1010 | +2 |
| 100001 | 1010 | +1 |
| 100000 (32) | 1000 | 0 |

TABLE C

| A/D Output | Error Function Output Address | Increment Register |
|---|---|---|
| 011111 (31) | 0111 (7) | −1 |

TABLE C-continued

| A/D Output | Error Function Output Address | Increment Register |
|---|---|---|
| 011110 (30) | 0110 | −2 |
| 011101 | 0101 | −3 |
| 011100 | 0100 | −4 |
| 011011 | 0011 | −5 |
| 011010 | 0010 | −6 |
| 011001 | 0001 | −7 |
| 011000 (24) | 0000 (0) | −8 |
| 010111 (23) | 1111 (15) | +7 |
| 010110 | 1110 | +6 |
| 010101 | 1101 | +5 |
| 010100 | 1100 | +4 |
| 010011 | 1011 | +3 |
| 010010 | 1010 | +2 |
| 010001 | 1010 | +1 |
| 010000 (16) | 1000 | 0 |

TABLE D

| A/D Output | Error Function Output Address | Increment Register |
|---|---|---|
| 001111 (15) | 0111 (7) | −1 |
| 001110 (14) | 0110 | −2 |
| 001101 (13) | 0101 | −3 |
| 001100 | 0100 | −4 |
| 001011 | 0011 | −5 |
| 001010 | 0010 | −6 |
| 001001 | 0001 | −7 |
| 001000 (8) | 0000 (0) | −8 |
| 000111 (7) | . | . |
| 000110 | . | . |
| 000101 | . | . |
| 000100 | . | . |
| 000011 | . | . |
| 000010 | . | . |
| 000001 | . | . |
| 000000 (0) | 0000 | −8 |

FIG. 4 is a representative histogram of the type that is provided by the various count magnitudes that are stored in the sixteen storage locations of RAM 33 of FIG. 1, or in the sixteen registers of FIG. 3, after a disk drive has been tested in accordance with the invention. The horizontal axis of this figure presents the sixteen registers of FIG. 3, starting with register −8 on at the left end of the horizontal axis, and progressing through register 0, to register +7 at the right end of the horizontal axis. The vertical axis presents the relative count magnitudes that are stored in each register at the end of a test.

By way of example, the histogram of FIG. 4 may be generated by reading out the contents of the sixteen storage location of RAM 33, the sixteen registers shown in FIG. 3, after the testing of the disk drive, and then using this derived data to drive a display means such as a cathode ray tube or a printer 37 of FIG. 1.

In FIG. 4, the histogram is shown as being quite symmetrical about the count values that are stored in registers 0 and −1. While this is a typical case, it need not be so. Also note that in this exemplary case, no counts were stored in the four end registers −8, −7, +6 and +7. This situation is an indication that the tested disk drive will be able to sustain a fairly high data rate before read back errors begin to occur.

Those skilled in the art will readily visualize a number of ways in which the present invention can be used to test disk drives. As an example of one such use, a manufacturing specification for disk drives of a given type may specify the minimum histogram dimension 90 and/or 91 that must exist in order for a disk drive to pass a manufacturing qualification test. Another approach to the use of a histogram in accordance with the invention is to extend the generally bell shaped curve, as at 92 and 93, in order to estimate at what data rate read errors will likely begin to occur. For example, a histogram such as is shown by dotted line 100 would likely indicate a failing disk drive, due to the flat slope exhibited by the two ends of the histogram curve.

Further utility for the invention is found when a testing means in accordance with the invention is incorporated within each disk drive that is manufactured. In this way, operation of the invention can be performed periodically during the life of the disk drive, perhaps as a portion of periodic maintenance procedures.

The present invention has been described with reference to preferred embodiments thereof. However, it is recognized that those skilled in the art will readily conceive of yet other embodiments that are within the spirit and scope of the invention. Thus, it is intended that the above detailed description not be considered as a limitation on the invention. Rather, the spirit and scope of the invention is to be considered as it is defined in the claims hereof.

What is claimed is:

1. A method for determining the data error rate of a rotating magnetic memory device having a magnetic recording disk onto which data is written and from which data is read and on which data has been written, and having amplitude detection circuit means for detecting said data upon reading the same back from said disk, said detection circuit means including data clock means, the method comprising the steps of,
   A—reading said data back from said disk, to thereby generate an analog signal that is representative of said data,
   B—sampling the amplitude of said analog signal at a plurality of intervals of said data clock, to thereby produce a plurality of individual amplitude samples,
   C—comparing each of said plurality of individual amplitude samples to respective expected amplitude for the written data that is decoded at said interval of said data clock, and generating a plurality of difference values as a result thereof,
   D—value segregating said plurality of difference values, and storing a count of the number of each of said difference values, and
   E—translating said stored count of difference values into a measure of the data error rate of said rotating magnetic memory device.

2. The method of claim 1
   wherein step B includes the step of converting said plurality of individual analog amplitude samples into a plurality of individual digital amplitude samples, and
   wherein step C includes comparing each of said plurality of digital amplitude samples to a predetermined reference digital amplitude, and generating a plurality of digital difference values as a result thereof.

3. The method of claim 2 wherein said rotating magnetic memory device operates to write said data to said disk with said data encoded in accordance with a partial response coding technique, and wherein said amplitude detection circuit means operates to detect the data content of an analog partial response read back signal.

4. The method of claim 1 further including the step of recording binary data on said magnetic recording disk after said binary data has been encoded using a partial response coding technique, wherein step A comprises reading said coded binary data pattern back from said disk, to thereby generate a continuous analog signal that is representative of said coded binary data pattern, and wherein step C occurs prior to partial response decoding of the said coded binary data pattern that is generated in step A.

5. The method of claim 4
wherein step B includes the step of converting said plurality of analog samples into a plurality of digital samples, and
wherein step C includes comparing each of said plurality of digital samples to a predetermined reference digital amplitude, and generating a plurality of digital difference values as a result thereof.

6. A rotating magnetic memory device having a magnetic recording disk, comprising;
write channel means for writing amplitude encoded data onto said disk,
read channel means for reading said written data back from said disk, and for generating an analog read signal as a result thereof,
analog to digital convertor means having an output, and having an input connected to receive said analog read signal,
clock means connected in controlling relation to said analog to digital convertor means, and operable to cause said analog to digital convertor means to provide at said output a sample digital amplitude at predetermined intervals of said clock means,
amplitude sensitive data decoding means connected to the output of said analog to digital convertor means,
read error function means connected to the output of said analog to digital convertor, and operable to compare said sample digital amplitudes at said predetermined intervals of said clock means to respective expected digital amplitudes for said samples, to thereby generate a digital difference amplitude for each of said sample digital amplitudes,
memory means for segregating said digital difference amplitudes in accordance with the different magnitudes thereof, and
means for addressing said memory means and for providing output display means depicting a frequency histogram of said segregated digital difference magnitudes.

7. The rotating magnetic memory device of claim 6 wherein said memory means value segregates said digital difference magnitudes, and stores a count of the number of occurrences of each individual one of said digital difference magnitudes, and wherein said means for addressing said memory means translates said stored count of individual difference magnitudes into a measure of the read error rate of said rotating magnetic memory device.

8. The magnetic memory device of claim 7 wherein said memory means comprises counter means having a plurality of addressable locations, the address of each location of said counter means corresponding to a different individual digital difference magnitude, and wherein the content of each of said addressable locations increments one count for each addressing event.

9. The magnetic memory device of claim 8 wherein said write channel means operates to write data to said disk with said data encoded in accordance with a partial response coding technique, and wherein said read channel means operates to amplitude sample detect the data content of an analog partial response read back signal.

10. A method for determining the read error rate of a magnetic disk drive storage device and the like having magnetic recording media onto which data is written and from which data is read and on which binary data has been written using partial response coding techniques, wherein upon the reading back of said binary data from said media an analog read signal is generated and a data clock is generated therefrom, such that the amplitude of said analog signal at clock pulse times enables amplitude decoding of said analog signal into said written binary data, independent of the time position of peak amplitudes of said analog signal, and wherein said amplitude decoding comprises the detection of a number of threshold levels of said analog signal at clock pulse times in order to decode said analog signal into said written binary data, the method comprising the steps of;

A—reading said data back from said media, to thereby generate an analog read signal that is representative of said written binary data, said analog signal having a base value of zero and having signal peaks that traverse said threshold levels, B—sampling the amplitude of said analog signal at said clock pulse times, to thereby produce a plurality of individual amplitude samples, C—comparing each of said plurality of individual amplitude samples to respective expected amplitudes for the written binary data that is decoded at said clock pulse times, and generating a plurality of difference values, including a zero difference value, as a result thereof, D—value segregating said plurality of difference values, and storing a count of the number of occurrences of each different one of said difference values, and E—translating said stored count of said value segregated difference values into a determination of the data error rate of said magnetic storage device.

11. The method of claim 10
wherein step B includes the step of converting said plurality of individual analog amplitude samples into a plurality of individual digital amplitude samples, and
wherein step C includes comparing each of said plurality of digital amplitude samples to a respective expected digital amplitude, and generating a plurality of digital difference values as a result thereof.

12. The method of claim 11 wherein step E includes the generation of a histogram of said stored count of value segregated difference values.

13. The method of claim 11 wherein said disk drive operates to write said binary data to said media with said data encoded in accordance with a partial response IV coding technique, wherein said number of respective expected digital amplitudes is equal to three, wherein said expected amplitudes are determined in relation to an amplitude between $-A$ and $+A$ corresponding to the decoding of a binary "0", and to the amplitudes of greater than $+A$ or less than $-A$ corresponding to the decoding of a binary "1".

14. The method of claim 13 including wherein step C occurs prior to the partial response IV decoding of the said analog read signal that is generated in step A.

15. The method of claim 14 wherein step E includes the generation of a histogram of said segregated difference values, said histogram being generally gaussian in shape, and enabling the prediction of storage device read failure even when no such failure occurred in step A.

16. The method of claim 10 wherein step C occurs prior to the partial response decoding of the said analog read signal that is generated in step A.

17. The method of claim 16
wherein step B includes the step of converting said plurality of analog samples into a corresponding plurality of digital samples, and
wherein step C includes comparing each of said plurality of digital samples to respective expected digital amplitudes, and generating a plurality of digital difference values as a result thereof.

18. The method of claim 17 wherein step E includes the generation of a histogram of said segregated difference values, said histogram being shaped so as to enable prediction of storage device read failure.

19. The method of claim 10 wherein step D comprises the steps of
providing a plurality of individually addressable storage locations, said storage locations being constructed and arranged to increment the stored count content thereof by one count for each address occurrence,
generating the same storage address for all similar ones of said value segregated difference values, and
utilizing said generated storage addresses to address said storage locations, to thereby store a count of the number of occurrences of said similar ones of said value segregated difference values.

20. The method of claim 19 wherein step E includes the generation of a histogram display of said segregated difference values, said histogram being shaped so as to enable a determination of storage device read failure.

* * * * *